United States Patent
Cornwell et al.

(10) Patent No.: US 9,470,594 B2
(45) Date of Patent: Oct. 18, 2016

(54) DIFFERENTIAL PRESSURE SENSOR WITH DUAL OUTPUT USING A DOUBLE-SIDED CAPACITIVE SENSING ELEMENT

(71) Applicant: Kavlico Corporation, Moorpark, CA (US)

(72) Inventors: William D. Cornwell, Beavercreek, OH (US); Mark L. Urban, Ventura, CA (US); Marcos A. Nassar, Los Angeles, CA (US)

(73) Assignee: Sensata Technologies, Inc., Attleboro, MA (US)

( * ) Notice: Subject to any disclaimer, the term of this patent is extended or adjusted under 35 U.S.C. 154(b) by 161 days.

(21) Appl. No.: 14/158,213

(22) Filed: Jan. 17, 2014

(65) Prior Publication Data

US 2015/0204747 A1    Jul. 23, 2015

(51) Int. Cl.

| | | |
|---|---|---|
| *G01M 15/10* | (2006.01) | |
| *G01L 9/12* | (2006.01) | |
| *G01L 9/00* | (2006.01) | |
| *G01L 13/02* | (2006.01) | |
| *G01L 15/00* | (2006.01) | |
| *G01L 7/08* | (2006.01) | |
| *F02D 41/00* | (2006.01) | |

(52) U.S. Cl.
CPC ............ *G01L 9/12* (2013.01); *F02M 26/47* (2016.02); *G01L 7/08* (2013.01); *G01L 9/0075* (2013.01); *G01L 13/025* (2013.01); *G01L 15/00* (2013.01); *G01M 15/106* (2013.01); *F02D 41/0072* (2013.01); *F02D 2200/0406* (2013.01); *F02D 2200/0812* (2013.01)

(58) Field of Classification Search
USPC ............... 73/114.37, 114.74, 114.76
See application file for complete search history.

(56) References Cited

U.S. PATENT DOCUMENTS

| | | | | | |
|---|---|---|---|---|---|
| 4,996,627 | A | * | 2/1991 | Zias ...................... | G01L 9/0073 205/656 |
| 5,048,165 | A | * | 9/1991 | Cadwell ................ | G01L 9/0042 29/25.41 |
| 6,568,274 | B1 | * | 5/2003 | Lucas ..................... | G01L 19/04 73/718 |
| 2003/0121332 | A1 | * | 7/2003 | Mathew ................ | G01L 9/0072 73/753 |

(Continued)

FOREIGN PATENT DOCUMENTS

| | | |
|---|---|---|
| EP | 2137398 B1 | 7/2012 |
| GB | 2005839 A | 4/1979 |
| WO | 87/03088 A1 | 5/1987 |

OTHER PUBLICATIONS

May 8, 2015 (EP) Extended Search Report—App 15151378.5.

*Primary Examiner* — Eric S McCall
(74) *Attorney, Agent, or Firm* — Banner & Witcoff, Ltd.

(57) ABSTRACT

A differential capacitive pressure sensor of an embodiment of the present invention has first and second diaphragms positioned on opposing sides of a single substrate. Each diaphragm of the pressure transducer is configured to be exposed to a transient fluid, with the first and second pressure transducers being arranged with their respective deflection surfaces directed outwardly from each other. The differential capacitive pressure sensor may be configured to output representations of differential and common mode pressure of the transient fluids, where a representation of a common mode is cancelled in generating the representation of the differential pressure. The transient fluids may be the same fluid at different locations within a flow path. The diaphragms may be constructed from a ceramic material to be able to withstand exposure to corrosive or caustic fluids.

11 Claims, 3 Drawing Sheets

(56) References Cited

U.S. PATENT DOCUMENTS

2007/0180924 A1* 8/2007 Warren .................. B82Y 35/00
　　　　　　　　　　　　　　　　　　　　　　 73/780

2008/0173303 A1* 7/2008 McLaughlin ......... A61M 16/00
　　　　　　　　　　　　　　　　　　　　　　 128/204.23
2011/0232614 A1　 9/2011 Emerick et al.

* cited by examiner

DIFFERENTIAL PRESSURE SENSOR WITH DUAL OUTPUT USING A DOUBLE-SIDED CAPACITIVE SENSING ELEMENT

BACKGROUND OF THE INVENTION

A capacitive pressure transducer converts changes in pressure applied to its diaphragm, such as by a fluid, into corresponding capacitance changes to enable pressure measurements. Behind the diaphragm is a pressure cavity with parallel offset conductive plates that compose a variable capacitor to detect strain due to applied pressure on the diaphragm, where one of the parallel offset conductive plates is in a fixed position relative to the diaphragm and the other is affixed to the diaphragm.

Typical pressure sensors include two major parts: (i) an element affected by pressure changes, such as a capacitive pressure transducer, and (ii) electronics for providing a modulated electrical signal to the capacitive pressure transducer and for detecting effects on the modulated signal imparted by the capacitive pressure transducer as a function of the pressure changes.

Typical capacitive pressure transducers use metal, ceramic, or silicon diaphragms to which one parallel offset conductive plate is attached. The other plate is attached to a substrate that is insensitive to pressure changes. Pressure changes induce flexion in the diaphragm, which change the distance between the parallel offset conductive plates, causing a measurable change in capacitance. This change may or may not be linear and is typically no more than a few picofarads out of a total capacitance of 5-100 pF. This change in capacitance may be used to control the frequency of an oscillator or to vary the coupling of an AC signal. The electronics for signal conditioning are commonly located close to the transducing elements, preventing errors due to stray capacitance.

SUMMARY OF THE INVENTION

An example embodiment of the present invention is a differential pressure transducer having a first pressure transducer with a first deflection surface, the first pressure transducer integrated with a first substrate, and a second pressure transducer with a second deflection surface, the second pressure transducer integrated with a second substrate. The first pressure transducer is configured to be exposed to a first transient fluid, and the second pressure transducer is configured to be exposed to a second transient fluid. The first and second pressure transducers are arranged with respective deflection surfaces directed outwardly from each other and within a distance that, when the deflection surfaces are observed together, enables cancelling of a representation of a common mode of pressures of the first and second transient fluids in generating a representation of a differential pressure measurement of the first and second transient fluids. Alternatively, the first and second substrates are affixed together in a back-to-back arrangement directly or to an intermediate medium, such as a third substrate or a structure.

In an example embodiment of the present invention, the first and second substrates of the differential pressure sensor are opposing volumes of a common substrate.

In one embodiment, the first and second pressure transducers are arranged with their respective deflection surfaces facing outwardly from each other along a common perpendicular axis relative to the deflection surfaces.

The first and second transient fluids may be the same fluid at different locations within a flow path. The diaphragm may be a ceramic diaphragm able to withstand exposure to corrosive or caustic fluids.

In another embodiment, the first and second deflection surfaces are surfaces of respective first and second diaphragms, the first and second diaphragms are positioned offset from respective substrates with respective spacers configured to position a gap between an internal surface of the first and second diaphragms and the respective substrates. The spacers may be made of glass.

In yet another embodiment, each of the first and second pressure transducers includes a diaphragm, first and second conductive plate electrodes arranged in parallel, and first and second electrode leads in electrical communication with respective conductive plate electrodes. The first conductive plate electrodes are positioned on an internal surface of the respective diaphragms, and the second conductive plate electrodes are positioned on the respective substrates. The first and second conductive plate electrodes are offset by a gap distance between the respective opposite conductive plate electrodes. The gap distances change based on corresponding changes in the pressure applied to the respective diaphragm by the respective transient fluids. Changes in the gap distance cause associated changes in the capacitance of the respective first and second plates.

The diaphragms may be ceramic diaphragms.

Another example embodiment of the present invention is a method of transducing pressure including changing a first capacitance associated with a first deflection surface in response to pressure changes associated with a first transient fluid, changing a second capacitance associated with a second deflection surface in response to pressure changes associated with a second transient fluid, and combining changes of the first and second capacitances includes cancelling a representation of a common mode pressure, imparted by the first and second transient fluids upon the first and second deflection surfaces, in generating a representation of a differential pressure measurement of the first and second transient fluids.

In one embodiment, changing the first capacitance and changing the second capacitance are performed on opposing sides of a common substrate.

In another embodiment, changing the first capacitance and changing the second capacitance occurs along a common perpendicular axis relative to the deflection surfaces.

In yet another embodiment, changing the first capacitance in response to pressure changes associated with the respective transient fluid includes maintaining a spacing of first and second diaphragms away from their respective substrates with spacers, the spacers define a gap distance between an internal surface of the first and second diaphragms and the respective substrates, and changing the gap distance in response to pressure changes associated with the respective transient fluid. The spacers may be glass spacers.

In another embodiment, maintaining the spacing between the first and second diaphragms further includes maintaining the spacing between conductive plate electrodes associated with the internal surfaces of the diaphragms and their respective substrates. The conductive plate electrodes form first and second capacitors having a first and second capacitance.

In one embodiment, changing the gap distance in response to pressure changes associated with the respective transient fluid includes changing the first and second capacitance in response to pressure changes associated with the respective transient fluid.

An example embodiment of the present invention is a method of measuring pressure in two transient fluids including transducing deflection of a first diaphragm into a first capacitance associated with the first diaphragm, transducing deflection of a second diaphragm into a second capacitance associated with the second diaphragm, measuring changes in the first and second capacitances, cancelling a representation of a common mode of respective first and second transient fluids in generating and outputting an electric signal representation of the differential pressure measurement of the first and second transient fluids. The first diaphragm deflects in response to changes in the pressure of the first transient fluid and the second diaphragm deflects in response to changes in the pressure of the second transient fluid.

Another example embodiment of the present invention is a differential pressure sensor including a first capacitive pressure transducer configurable to be exposed in pressure communication with a first transient fluid, a second capacitive pressure transducer configurable to be exposed in pressure communication with a second transient fluid, and an electronics circuit configured to measure changes in capacitances of the first and second capacitive pressure transducers in response to changes in the pressures of the respective transient fluids, the electronics circuit configured to output the representation of the differential pressure measurement of the first and second transient fluids. The first pressure transducer is integrated with a first substrate and the second pressure transducer is integrated with a second substrate. The first and second substrates are arranged in a manner that enables cancelling a representation of a common mode pressure of the first and second transient fluids in generating a representation of a differential pressure measurement of the first and second transient fluids.

In one embodiment, the first and second substrates are opposing volumes of a common substrate or separate substrates coupled together directly or via an intermediate substrate or structure.

In another embodiment, the electronics circuit includes a differentiator configured subtract a measurement signal of the first capacitive pressure transducer from a measurement signal of the second capacitive pressure transducer.

In yet another embodiment, the electronics circuit is further configured to output at least one signal representing an absolute pressure of the first transient fluid, the second transient fluid, or both.

An example embodiment of the present invention is an internal combustion engine including first and second transient fluids, an engine controller configured to control an operational feature of the engine, and a sensor with a pair of pressure transducers in electrical communication with the engine controller, the sensor outputting a differential pressure of the first and second transient fluids to the controller without a representation of a common mode of the first and second transient fluids.

In one embodiment, the internal combustion engine further includes an exhaust gas recirculation valve with an intake pressure and an exhaust pressure. The pair of pressure transducers are configured to measure transient fluid pressures of the intake pressure and the exhaust pressure and provide the measured pressures, absent a representation of a common mode, to the controller.

In another embodiment, the internal combustion engine further includes a diesel particulate filter with an inflow pressure and an outflow pressure. A pair of pressure transducers are configured to measure transient fluid pressures of the inflow pressure and the outflow pressure.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

Figure 1A:
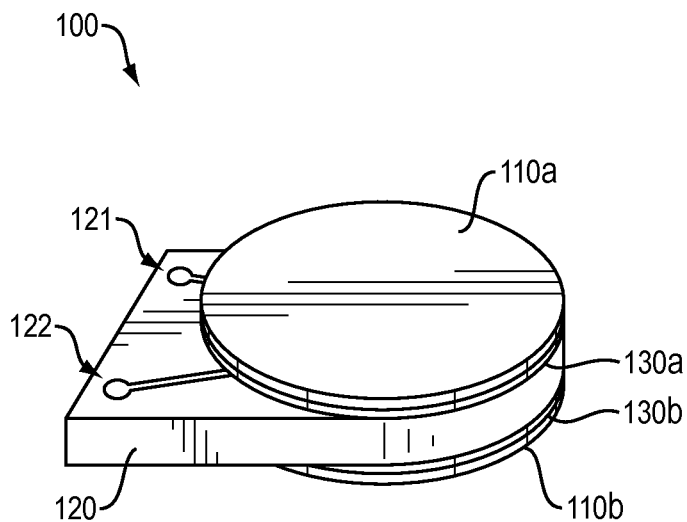
FIGS. 1A and 1B are perspective and profile views, respectively, of a double-sided pressure transducer having elements of the present invention.

A description of example embodiments of the invention follows.

A differential pressure sensor based on two capacitive sensing elements that share, in one embodiment, a common substrate is described herein. The common substrate, in such an embodiment, reduces the cost of the sensing elements, reduces packaging complexity, and aids in thermal stability of the sensor by equalizing temperature between diaphragms of the capacitive sensing elements.

In addition, a dual output Application Specific Integrated Circuit (ASIC) may be utilized to provide a differential pressure output signal and an absolute pressure output signal. The differential pressure output signal, based on an arrangement of the two capacitive sensing elements, provides a representation of differential pressure measurement of pressure (with common mode filtered) transduced by the two capacitive sensing elements, while the absolute pressure output signal simultaneously provides a representation of an absolute pressure measurement of pressure (without common mode filtered) transduced by one (or both) of the capacitive sensing element(s). This capability eliminates need for a separate sensing element to measure the absolute pressure. The term "filtered" herein may alternatively be termed cancelled or subtracted. There are alternative analog or digital techniques that may be employed to accomplish removal of a common mode, as understood in the art. An example of which is presented herein as subtracting two electrical signals that include two representations of the common mode in generating a representation without the common mode.

A differential pressure sensor senses a differential between two (or more) pressures. Media that creates pressure to be sensed may be, for example, gas or liquid, referred to herein in general as a fluid. Differential pressure sensors can be divided in two broad categories: true differential pressure sensors and two sensing elements pressure sensors.

A true differential pressure sensor employs a true differential transducer. A pressure is applied to each side of a single diaphragm of the transducer, and the single diaphragm deflects towards the lower pressure side in proportion to the pressure difference. A suitable detection method, such as through use of a strain gauge measurement or capacitance measurement, is used to measure the diaphragm deflection. The advantage of a true differential sensor is its ability to withstand large common mode pressures. Its main disadvantage is that the sensors used to measure diaphragm deflection (i.e., strain gauges, capacitive electrodes, etc.) are exposed to the pressure media, which can be harsh and corrosive. One way to overcome this problem is by isolating the diaphragm from the media using an oil volume and an isolation membrane to transfer the pressure to the diaphragm. However, this approach adds complexity, inaccuracies, temperature sensitivity, and cost.

Two-sensing elements pressure sensors utilize two separate transducing elements to measure pressures independently. A difference between the measured pressures is computed using a suitable electronic circuit, which may employ a computational unit if the sensor incorporates a microcontroller to perform some calculations. An example advantage of a two-sensing elements pressure sensor approach is that the sensors used to measure diaphragm deflection (e.g., the capacitive plates of a capacitive pressure transducer) are not exposed to the pressure media, resulting in increased robustness when placed in harsh environments.

Figure 1B:
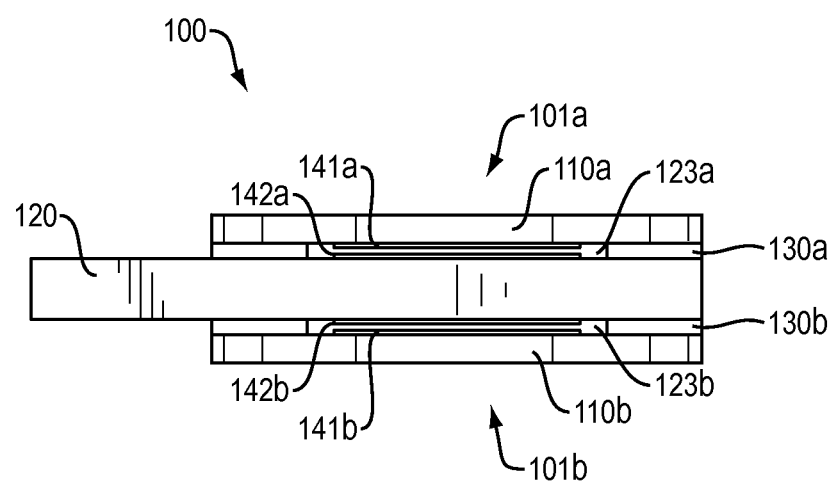

FIGS. 1A and 1B are perspective and profile views, respectively, of a double-sided pressure transducer according to an embodiment of the present invention. This example embodiment incorporates a first diaphragm 110a on a first side of a substrate 120 to form a first pressure transducing element 101a and places a second diaphragm 110b on a second (opposite) side of the substrate 120 to form a second pressure transducing element 101b. The two pressure transducing elements 101a, 101b can be identical or can be tailored individually to different pressure requirements by changing the thickness of the diaphragms 110a, 110b, diameter of the diaphragms 110a, 110b, or design of conductive plate electrodes 141a, 141b, 142a, 142b.

Although the two sides share the same substrate 120, they are essentially independent transducing elements and may be integrated with the same or individual substrates (not shown) for manufacturing considerations. In the latter case, the individual substrates are positioned together in a back-to-back arrangement to form a common substrate 120 after the individual pressure transducing elements are assembled or are otherwise coupled together via a third substrate or other structure or structural element, such as a flat and stiff wall of a mechanical assembly, such as an interior wall of an internal combustion engine.

In one embodiment, each pressure transducing element 101a, 101b is a capacitive transducing element defining a sensing capacitor therein. The sensing capacitors are configured to change capacitance in correspondence with deflection of the associated flexible diaphragm 110a, 110b. The diaphragms 110a, 110b may be individually exposed to be in fluid contact with transient or stationary fluids and deflect in response to pressure changes applied by the corresponding fluids.

The spacers 130a, 130b isolate an internal cavity 123a, 123b (FIG. 1B) of the pressure transducing elements 101a, 101b to protect the sensing capacitors defined by parallel conductive plates within the internal cavities from exposure to fluids and other substances within the environment to be sensed.

FIG. 1B shows the double-sided capacitive pressure transducer 100 of FIG. 1A. In FIG. 1B, two pressure transducing elements 101a, 101b are illustrated on opposite sides of a substrate 120. The first pressure transducing element 101a is mounted to a first side of the rigid substrate 120 and has a flexible diaphragm 110a separated from the substrate 120 by a small gap in an internal cavity 123a. The internal cavity 123a and the gap are formed by the spacer 130a bonding the inside surface of the diaphragm 110a to the first surface of the substrate 120. The spacer 130a joins the diaphragm 110a to the substrate 120 and creates the gap between a conductive plate electrode 142a printed on the first (upper) surface of the substrate 120 and a conductive plate electrode 141a printed on the inside surface of the first diaphragm 110a. This spacer 130a is normally a non-conductive material, such as glass, that is fused to the substrate 120 and corresponding diaphragm 110a at high temperature to produce an airtight seal. Electrode leads 121, 122 (shown in FIG. 1A) are incorporated on the first surface of the substrate 120 and enable external electrical connections to be made to the conductive plate electrodes 141a, 142a, respectively. These conductive plate electrodes 141a, 142a, with the gap between them, form the sensing capacitor of the first pressure transducing element 101a, as shown in FIG. 1B.

The second pressure transducing element 101b is mounted to the opposite, or second, side of the rigid substrate 120 and has a flexible diaphragm 110b separated from the substrate 120 by a small gap in a corresponding internal cavity 123b. The gap is formed by a spacer 130b bonding the inside surface of the diaphragm 110b to the second (lower) surface of the substrate 120. The spacer 130b joins the diaphragm 110b to the substrate 120 and creates a gap between a conductive plate electrode 142b printed on the second (lower) surface of the substrate 120 and a conductive plate electrode 141b printed on the inside surface of the diaphragm 110b. This spacer 130b is normally a non-conductive material, such as glass, that is fused at high temperature to the substrate 120 and corresponding diaphragm 110b to produce an airtight seal. Electrode leads (not shown) are incorporated on the second surface of the substrate 120 and enable external electrical connections to be made to the conductive plate electrodes 141b and 142b. These conductive plate electrodes 141b, 142b, with the gap between them, form the sensing capacitor of the second pressure transducing element 101b, as shown in FIG. 1B.

FIGS. 1A and 1B illustrate the diaphragms 110a, 110b as being plane parallel to each other, also described herein as directed outwardly from each other along a common perpendicular axis relative to the deflection surfaces (i.e., the diaphragms 110a, 110b). In alternative embodiments, the diaphragms 110a, 110b may be non-parallel, such as both tilted in the same direction (i.e., in clockwise and counterclockwise rotations relative to each other) by some angular amount, such as ±5 degrees, ±10 degrees, ±30 degrees, or other angles that continue to enable detections of common mode pressures and removal of representations of same in generating a representation of a differential of the pressure sensed by the transducers.

The capacitance value C of the capacitive transducing elements 201a, 201b is typically measured in picofarads ($10^{-12}$ F) and is given by the following equation:

$$C = \frac{\varepsilon * A}{d},$$

where $\varepsilon$ is the dielectric constant of the media in the gaps (usually air), A is the area of the electrodes, and d is the distance or gap between conductive plate electrodes. As the diaphragms 110a, 110b deflect under pressure, the corresponding gaps d decrease, resulting in an increase in capacitance. Typically, a signal conditioning circuit converts the capacitance to a voltage or a digital signal calibrated to be proportional to the applied pressure. Additionally, a reference conductive plate electrode may be added to either side of the substrate and near the perimeter of one of the diaphragms so that its value does not change with pressure. This reference conductive plate electrode may be used to compensate for temperature effects, such as the thermal expansion of the glass spacers. For simplicity, a reference conductive plate electrode is not explicitly shown in FIGS. 1A and 1B.

Figure 2:
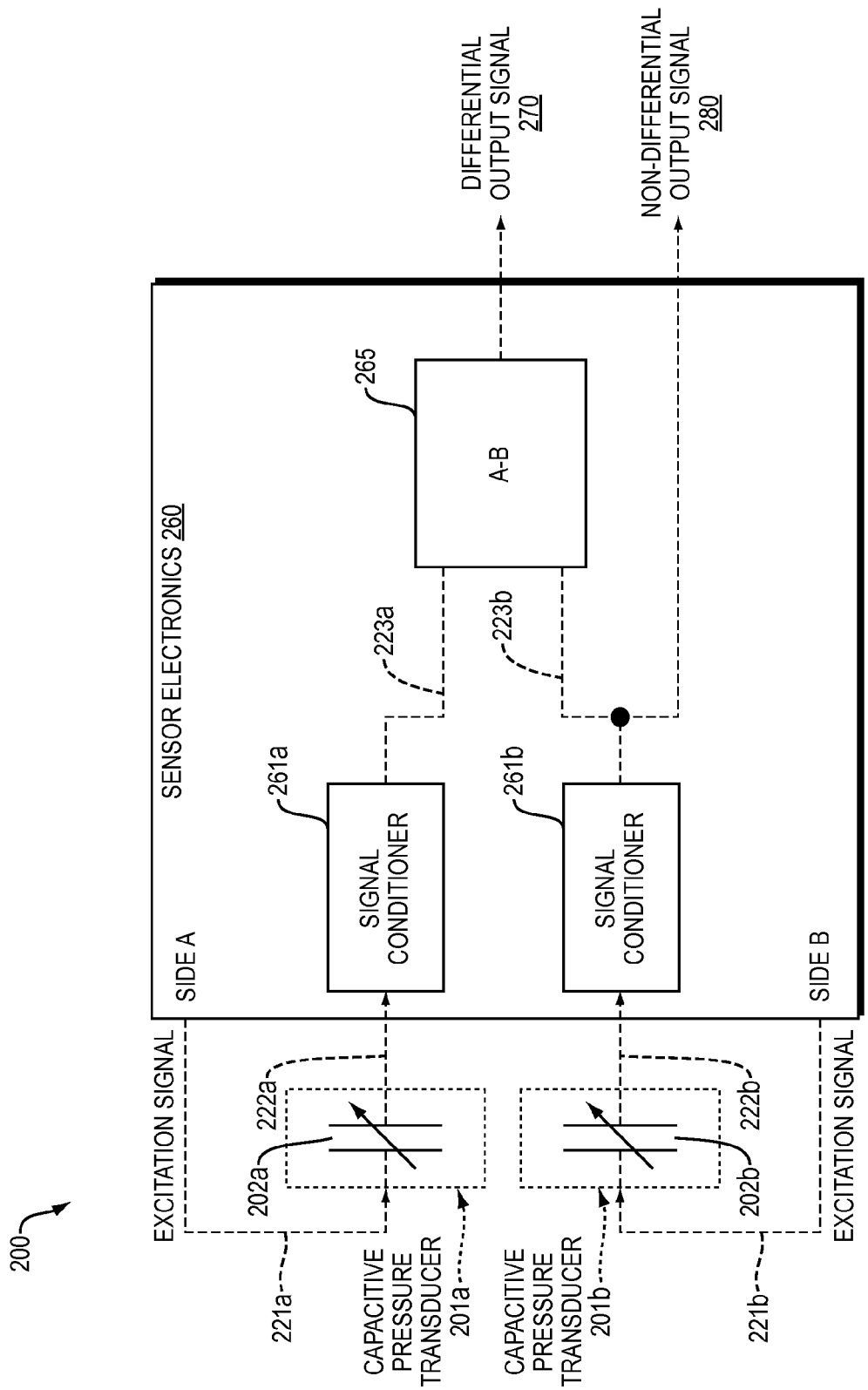
FIG. 2 is a block diagram of a pressure sensor employing the double-sided pressure transducer of FIGS. 1A and 1B in accordance with embodiments of the present invention.

FIG. 2 is a block diagram of a pressure sensor employing the double-sided pressure transducer of FIGS. 1A and 1B in accordance with embodiments of the present invention. Two pressure transducers 201a, 201b are the individual pressure transducers of the double-sided transducing element shown in FIGS. 1A and 1B.

Referring to FIG. 2, a pressure sensor 200 features an application-specific integrated circuit (ASIC) 260 that provides two sensor input ports 222a, 222b and two sensor output ports 280, 270. The input and output ports may support analog or digital signals.

The pressure sensor 200 has the two pressure transducers 201a, 201b connected to the two input ports 222a, 222b of the ASIC 260. The ASIC 260 has one dedicated differential output port 270 from a signal subtraction unit 265 and an absolute pressure output port 280 from one of the signal conditioners 261a, 261b corresponding to one of the pressure transducers 201a, 201b. The absolute pressure output corresponding to one of the two pressure transducers 201a, 201b, along with the differential pressure between the two transducers, enables the common mode pressure (i.e., common pressure applied to both pressure transducers 201a, 201b of the pressure sensor 200) to be calculated by adding or subtracting the differential output from the absolute, according to the sign of the differential pressure output.

Another way to understand FIG. 2 is to consider the first and second capacitive pressure transducers 201a, 201b in electrical communication with an application-specific integrated circuit (ASIC) 260 or other forms of circuit (not shown). The capacitive pressure transducers 201a, 201b transduce deflections of their respective diaphragm into respective electrical signals 222a, 222b as a function of the capacitance associated with their respective sensing capacitors 202a, 202b. The diaphragms of the capacitive pressure transducers 201a, 201b deflect in response to changes in the pressure of a respective transient fluid, causing a corresponding change in capacitance in their respective sensing capacitors 202a, 202b. The ASIC 260 energizes sensing capacitors 202a, 202b of the capacitive pressure transducers 201a, 201b with an excitation signal 221a, 221b (i.e., a time-varying voltage), and receives the respective electrical signal 222a, 222b modulated by the sensing capacitors 202a, 202b of the capacitive pressure transducers 201a, 201b.

Signal conditioners 261a, 261b (e.g., pre-amplifiers or amplifiers) prepare the electrical signals 222a, 222b for further amplification or processing by, for example, reducing noise or interference or boosting the signal strength. The signal conditioners 261a, 261b output conditioned signals 223a, 223b to a subtraction circuit (e.g., a fully differential amplifier) configured to reject a voltage or current representing a common mode pressure transduced by the pressure transducers 201a, 201b from the conditioned signals 223a, 223b and generate a differential output signal 270. The differential output signal 270 represents the voltage difference between the conditioned signals 223a, 223b. In this manner, the differential output signal 270 is a representation of the pressure difference between the capacitive pressure transducers 201a, 201b. One or both of the conditioned signals 223a, 223b may be output as non-differential output signal 280 representing the absolute pressure of one or both of the capacitive pressure transducers 201a, 201b.

Figure 3:
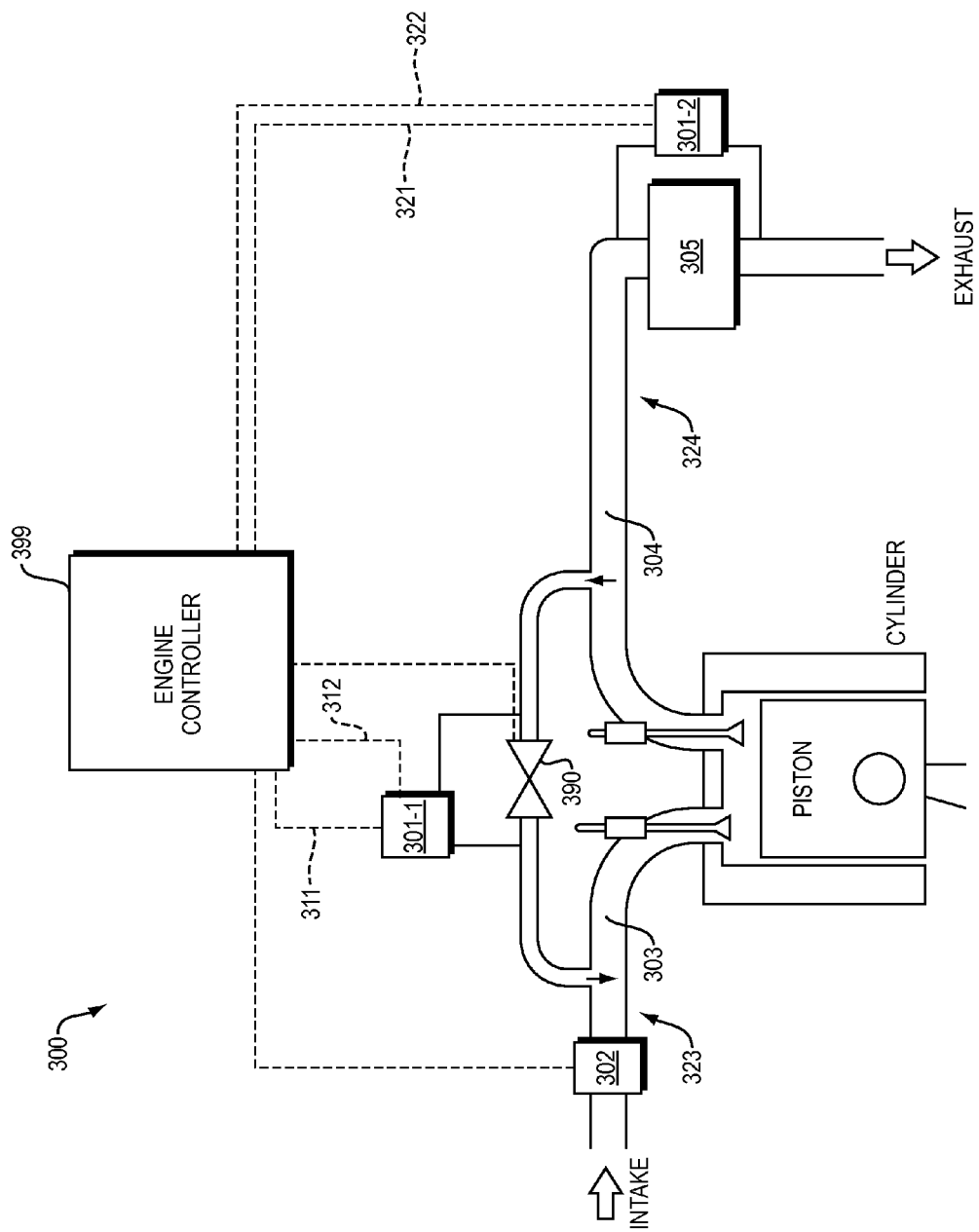
FIG. 3 is a diagram of a diesel internal combustion engine employing the double-sided pressure transducer of FIGS. 1A and 1B in accordance with embodiments of the present invention.

FIG. 3 is a diagram of an internal combustion diesel engine 300 employing the double-sided pressure transducer of FIGS. 1A and 1B in accordance with embodiments of the present invention. In the diesel engine 300, a differential signal 311 from a double-sided differential pressure sensor 301-1 having embodiments of the present invention is used to measure a pressure difference across an exhaust gas recirculation (EGR) valve 390. Additionally, features of the present invention enable the double-sided differential pressure sensor 301-1 to provide an absolute signal 312 with the manifold pressure downstream of a throttle body 302. The pressure signals 311, 312 are provided to an engine controller 399 in controlling electrical communication with the EGR valve 390 and a throttle body 302. Prior art configurations currently require a separate pressure sensor to measure manifold absolute pressure (MAP). The dual output sensor of the present invention, shown in detail in FIG. 2, is able to replace the prior art two-independent-sensor EGR systems by providing both the differential pressure signal 311 across the EGR valve 390 and the absolute pressure signal 312 of a fluid 303 in the intake manifold 323, thus lowering cost and complexity of an engine management system.

The use of a ceramic diaphragm allows both transducers of the double-sided differential pressure sensor 301-1 to be in direct pressure communication with the fluid 303 in the intake manifold 323 and the fluid 304 in the exhaust manifold 324, without need for a pressure-transmitting fluid, e.g., oil, to protect the diaphragm. Ceramic materials withstand harsher environments than silicone or metal due to the ability of ceramics to resist chemical erosion in caustic environments and their higher operating temperature range. Similar sensors employing non-ceramic diaphragms may require protection from environments commonly found in internal combustion engines.

A second double-sided differential pressure sensor 301-2 is used in the diesel engine 300 of FIG. 3 to measure pressure across a particulate exhaust filter 305. The second pressure sensor 301-2 provides a differential pressure output signal 321 and an absolute pressure output signal 322 to the engine controller 399. The differential pressure output signal 321 does not include a representation of a common mode pressure, as described above.

Embodiments of the invention apply to many types of differential pressure applications, and, in particular, to those in which a common mode pressure reading is also needed or of interest to be filtered. Examples of system that employ differential pressure transducers include automotive, aerospace, industrial, and medical systems.

While this invention has been particularly shown and described with references to example embodiments thereof, it will be understood by those skilled in the art that various changes in form and details may be made therein without departing from the scope of the invention encompassed by the appended claims.

What is claimed is:
1. A differential pressure sensor comprising:
   a first pressure transducer having a first deflection surface, said first pressure transducer integrated with a first substrate, the first deflection surface and the first substrate enclosing a first volume;

a second pressure transducer having a second deflection surface, said second pressure transducer integrated with a second substrate, the second deflection surface and the second substrate enclosing a second volume independent from the first volume and wherein the second pressure transducer operates independently from the first pressure transducer forming a double-sided differential pressure transducer; and the first pressure transducer configured to be exposed to a first transient fluid and the second pressure transducer configured to be exposed to a second transient fluid, the first and second pressure transducers being arranged with respective deflection surfaces directed outwardly from each other and within a distance that, when the deflecting surfaces are observed together, the differential pressure sensor outputs a signal representative of a differential pressure of the first transient fluid and the second transient fluid without a representation of a common mode pressure of the first and second transient fluids.

2. The differential pressure sensor of claim 1, wherein the first and second substrates are opposing volumes of a common substrate.

3. The differential pressure sensor of claim 1, wherein the first and second pressure transducers are arranged with respective deflection surfaces directed outwardly from each other along a common perpendicular axis relative to the deflection surfaces.

4. The differential pressure sensor of claim 1, wherein the first and second transient fluids are the same fluid at different locations within a flow path.

5. The differential pressure sensor of claim 1, wherein said first and second deflection surfaces are surfaces of respective first and second diaphragms, said first and second diaphragms positioned offset from respective substrates with spacers configured to create a gap between internal surfaces of said first and second diaphragms and the respective substrates.

6. The differential pressure sensor of claim 5, wherein the spacers are glass spacers.

7. The differential pressure sensor of claim 1, wherein each of said first and second pressure transducers includes a diaphragm, first and second conductive plate electrodes arranged in parallel, and first and second electrode leads in electrical communication with the respective conductive plate electrodes, wherein:

the first conductive plate electrodes are positioned on internal surfaces of said respective diaphragms and the second conductive plate electrodes are positioned on the respective substrates, said first and second conductive plate electrodes offset by a gap distance between the respective opposite conductive plate electrodes, said gap distance changing based on changes in the pressure applied to the respective diaphragm by the respective transient fluid.

8. The differential pressure sensor of claim 7, wherein the diaphragm is a ceramic diaphragm.

9. An internal combustion engine comprising:

first and second transient fluids;

an engine controller configured to control an operational feature of the engine;

a sensor with a pair of pressure transducers that share a common substrate and are in electrical communication with the engine controller, the sensor comprising an output, from an applicant specific integrated circuit, ASIC, to provide a differential pressure of the first and second transient fluids to the controller without a representation of a common mode of the first and second transient fluids, wherein the pair of pressure transducers operate independently as a double-sided capacitive pressure transducer.

10. The internal combustion engine of claim 9, further including an exhaust gas recirculation valve having an intake pressure and an exhaust pressure, wherein the pair of pressure transducers are configured to measure transient fluid pressures of the intake pressure and the exhaust pressure and provide same absent a representation of a common mode of the intake an exhaust pressures to the controller.

11. The internal combustion engine of claim 10, wherein the pair of pressure transducers are a first pair, and further including a diesel particulate filter having an inflow pressure and an outflow pressure, wherein a second pair of pressure transducers are configured to measure transient fluid pressures of the inflow pressure and the outflow pressure.

* * * * *